United States Patent
Yanagita et al.

(10) Patent No.: US 11,527,374 B2
(45) Date of Patent: Dec. 13, 2022

(54) TOUCH SENSING SYSTEM

(71) Applicant: FANUC CORPORATION, Yamanashi (JP)

(72) Inventors: Akihiro Yanagita, Yamanashi (JP); Takeshi Tsumura, Yamanashi (JP); Takahisa Hasegawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 320 days.

(21) Appl. No.: 16/832,565

(22) Filed: Mar. 27, 2020

(65) Prior Publication Data

US 2020/0312594 A1 Oct. 1, 2020

(30) Foreign Application Priority Data

Mar. 29, 2019 (JP) ............... JP2019-067618

(51) Int. Cl.
*B23K 9/095* (2006.01)
*H01H 47/22* (2006.01)
*B23K 9/10* (2006.01)

(52) U.S. Cl.
CPC .............. *H01H 47/22* (2013.01); *B23K 9/105* (2013.01)

(58) Field of Classification Search
CPC ...... H01H 47/001; H01H 9/548; H01H 47/22; B23K 9/127; B23K 9/105
See application file for complete search history.

(56) References Cited

U.S. PATENT DOCUMENTS

| | | | | |
|---|---|---|---|---|
| 5,656,183 A | * | 8/1997 | Niinuma ................. | B23K 9/164 219/137 R |
| 2013/0327754 A1 | * | 12/2013 | Salsich ................. | B23K 9/1043 219/137.71 |
| 2015/0136746 A1 | * | 5/2015 | Rappl ................... | B23K 9/124 219/130.21 |
| 2015/0283652 A1 | * | 10/2015 | Pfeifer .................... | H05B 6/06 219/130.21 |
| 2021/0346971 A1 | * | 11/2021 | Codina ............... | B23K 9/1087 |
| 2022/0032389 A1 | * | 2/2022 | Anders ................. | B23K 9/013 |

FOREIGN PATENT DOCUMENTS

| | | |
|---|---|---|
| JP | H01-205878 A | 8/1989 |
| JP | H07-195175 A | 8/1995 |
| JP | H09-150269 A | 6/1997 |
| JP | 2003225765 A | 8/2003 |

OTHER PUBLICATIONS

An Office Action; "Notice of Reasons for Refusal", mailed by the Japanese Patent Office dated Jun. 8, 2021, which corresponds to Japanese Patent Application No. 2019-067618 and is related to U.S. Appl. No. 16/832,565; with English language translation.

* cited by examiner

*Primary Examiner* — Jared Fureman
*Assistant Examiner* — Esayas G Yeshaw
(74) *Attorney, Agent, or Firm* — Studebaker & Brackett PC

(57) ABSTRACT

Provided is a touch sensing system that can make the life of a contact of an electromagnetic contactor longer. A touch sensing system includes a main operation circuit that connects a probe and a main operation power supply, and in which an electromagnetic contactor is provided; and a touch sensing circuit that is connected to the main operation circuit through the electromagnetic contactor in a branched manner, and connects the probe and a touch sensing power supply, is which a solid state relay switch is provided in the touch sensing circuit.

10 Claims, 6 Drawing Sheets

TOUCH SENSING SYSTEM

This application is based on and claims the benefit of priority from Japanese Patent Application No. 2019-067618, filed on 29 Mar. 2019, the content of which is incorporated herein by reference.

BACKGROUND OF THE INVENTION

Field of the Invention

The present invention relates to a touch sensing system.

Related Art

Until now, it has been practically used to automate the operation such as welding, coating, deburring, cutting, etc. using a robot.

Here, in the automation of such operations, the teaching process for teaching an operation to the robot is important, and when the workload of the teaching is comparatively small, online teaching is used which realizes the automation by actually moving the robot to perform the operation, detecting this operation by a sensor and storing the operation, and playing back the stored operation (teaching playback).

On the other hand, in the automation of welding operation, for example, the technique for detecting the welding position (such as a groove) of a base metal conveyed in a line is required. As the detection technique of the welding position, touch sensing for detecting such a welding position by bringing a probe attached to the tip of an electrode or torch (such as a wire) into contact with the base material is used (for example, refer to Japanese Unexamined Patent Application, Publication No. 2003-225765). In a case in which the surface of the base material is covered with an oxide film (insulator), the position detection may fail because the probe cannot detect conduction easily even if touching the base material. In order to prevent such failure, a power supply of high voltage (about 200 V) and low current may be used for the touch sensing. The oxide film can be broken by the spark generated by high voltage to obtain conduction between the base metal and the probe.

In a case of detecting a welding start position, a welding end position, or a welding joint position (groove position) M by the touch sensing, as shown in FIG. 1, a technique called "Stick Groove Search" or simply "Groove Search" is used to detect the groove M at the welding location as a recess by repeatedly bringing a torch 101a and a wire 101b (a probe 101) into contact with the surface T1 of the base material T intermittently in a manner such that a person uses a stick.

Furthermore, for example, as shown in FIG. 6, the touch sensing system (touch sensing unit) 100 for detecting the welding position or the like by Groove Search is configured such that an electromagnetic contactor 104 is provided in a welding circuit that connects the torch 101a and a welding power supply 102, and a touch sensing circuit 106 that connects the torch 101a and the touch sensing power source 105 is connected in a branched manner to the welding circuit 103 through the electromagnetic contactor 104.

Furthermore, in a case of performing the touch sensing, the electromagnetic contactor 104 is opened and closed in tune with the Groove Search operation in accordance with a touch sensing command, and when the torch 101a (the wire 101b) contacts the base material T, the touch sensing circuit 106 is connected, and a voltage of 200 V from the touch sensing power supply 105 is applied to the base material T.

Furthermore, when the torch 101a (the wire 101b) is distanced from the base material T, the electromagnetic contactor 104 is controlled to be opened and closed so that the torch 101a is connected to the welding circuit 103.

Patent Document 1: Japanese Unexamined Patent Application, Publication No. 2003-225765

SUMMARY OF THE INVENTION

However, in the touch sensing with the conventional Groove Search described above, each time the Groove Search operation is performed, the electromagnetic contactor 104 is opened and closed, and it is necessary to perform the alternate switching operation of the touch sensing circuit 106 and the welding circuit 103 (repeating ON/OFF of the touch sensing output of 200 V). Therefore, there is a problem that the touch sensing (the Groove Search operation) affects the life of the contacts of the electromagnetic contactor 104.

According to an aspect of the present disclosure, a touch sensing system includes a main operation circuit that connects a probe and a main operation power supply, and in which an electromagnetic contactor is provided; and a touch sensing circuit that is connected to the main operation circuit through the electromagnetic contactor in a branched manner, and connects the probe and a touch sensing power supply, in which a solid state relay switch is provided in the touch sensing circuit.

According to one aspect of the present disclosure, it is possible to switch between ON/OFF of the solid state relay without contacts and avoid the switching of the electromagnetic contactor. With such a configuration, it is unnecessary to perform an alternating switching operation between the touch sensing circuit and the main operation circuit (repeating ON/OFF of the touch sensing output of 200 V) as in the conventional manner, and it is possible to eliminate the problem in that the touch sensing affects the life of the contact of the electromagnetic contactor.

DETAILED DESCRIPTION OF THE INVENTION

Hereinafter, a description will be given of a touch sensing system according to an embodiment with reference to FIGS. 1 to 5.

Figure 1:
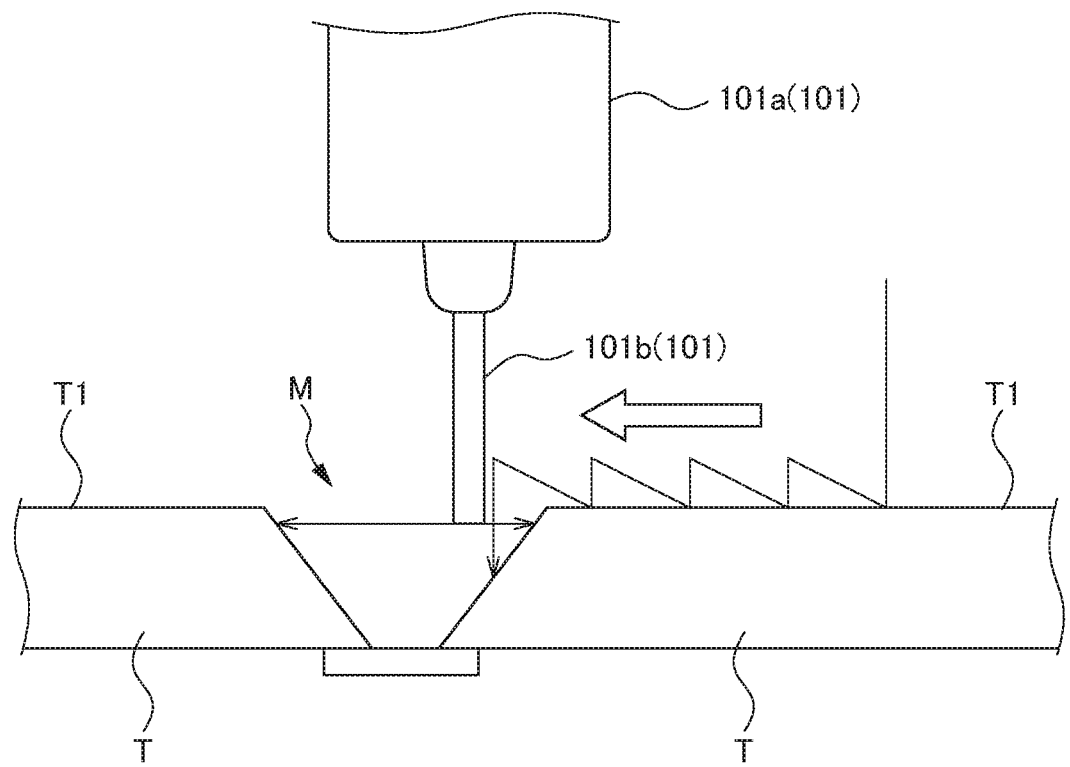
FIG. 1 is a diagram showing touch sensing (Groove Search operation) of an embodiment.

Herein, as shown in FIG. 1, in the description of the present embodiment provided below, the position of the groove M or the like is detected by touch sensing of Groove Search upon performing the arc welding operation. However, the touch sensing system of the present disclosure is not only applied to the welding operation, but also touch sensing of the other operations such as a painting/coating operation, deburring operation, or cutting operation.

Figure 2:
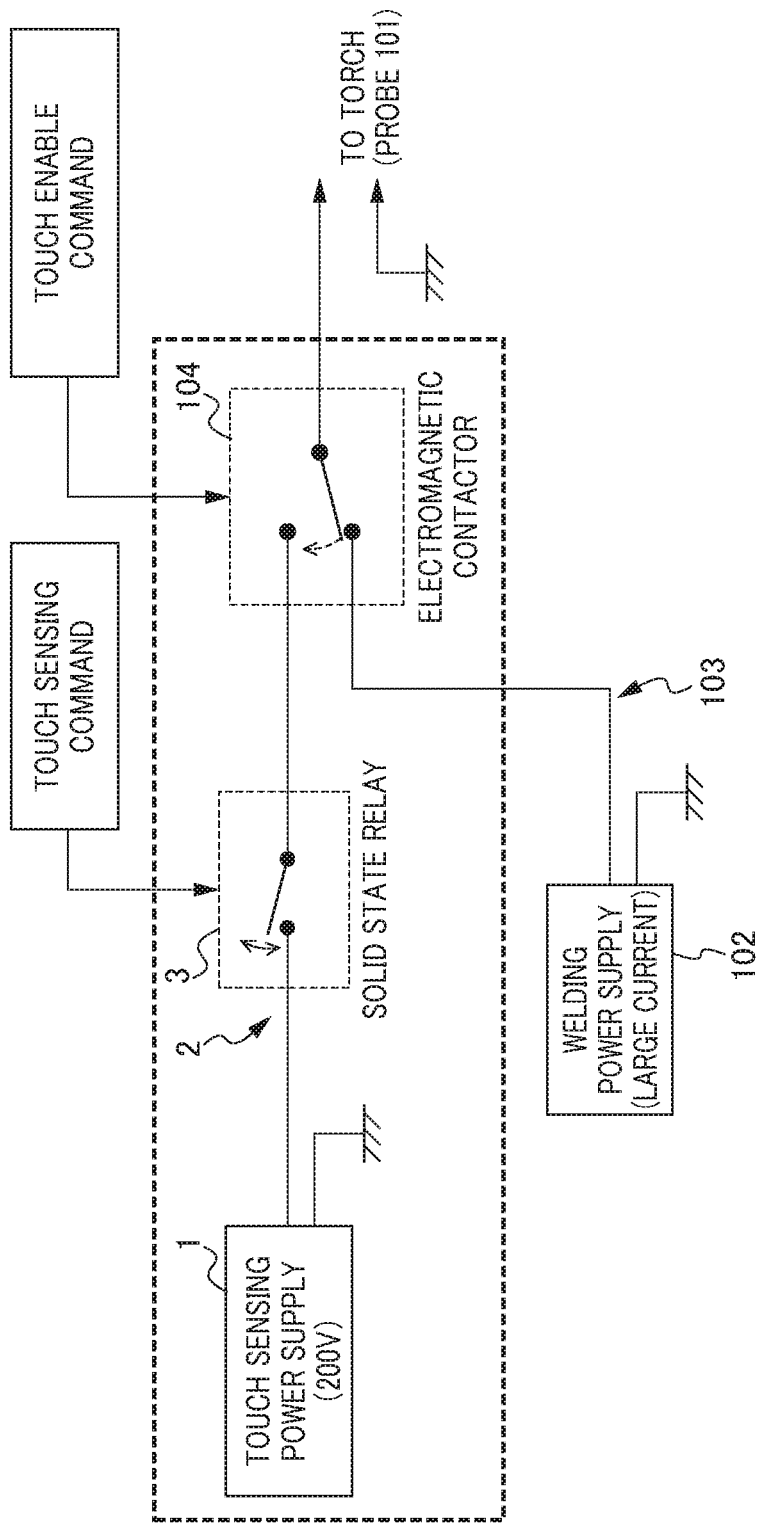
FIG. 2 is a diagram showing a touch sensing system of an embodiment.

As shown in FIGS. 1 and 2, a touch sensing system A of the present embodiment is configured such that an electromagnetic contactor 104 is provided in a welding circuit 103 (a main operation circuit) that connects a probe 101 (torch 101a and wire 101b) and a welding power supply 102 (a main operation power supply), and a touch sensing circuit 2 that connects the probe 101 and a touch sensing power supply 1 is connected to the welding circuit 103 through the electromagnetic contactor 104 in a branched manner.

Furthermore, in the touch sensing system A of the present embodiment, a solid state relay switch 3 (noncontact relay switch: SSR) is provided in the touch sensing circuit 2, i.e., between the touch sensing power supply 1 and the electromagnetic contactor 104. Furthermore, the solid state relay switch 3 is configured to be controlled to open/close by a touch sensing command (switched between ON/OFF).

The electromagnetic contactor 104 is configured to be controlled to open/close by a touch enable command (switched between ON/OFF), continue the connection between the welding circuit 103 and the probe 101 (OFF) during the welding operation, and continue the connection between the touch sensing circuit 2 and the probe 101 (ON) during the touch sensing.

Figure 3:
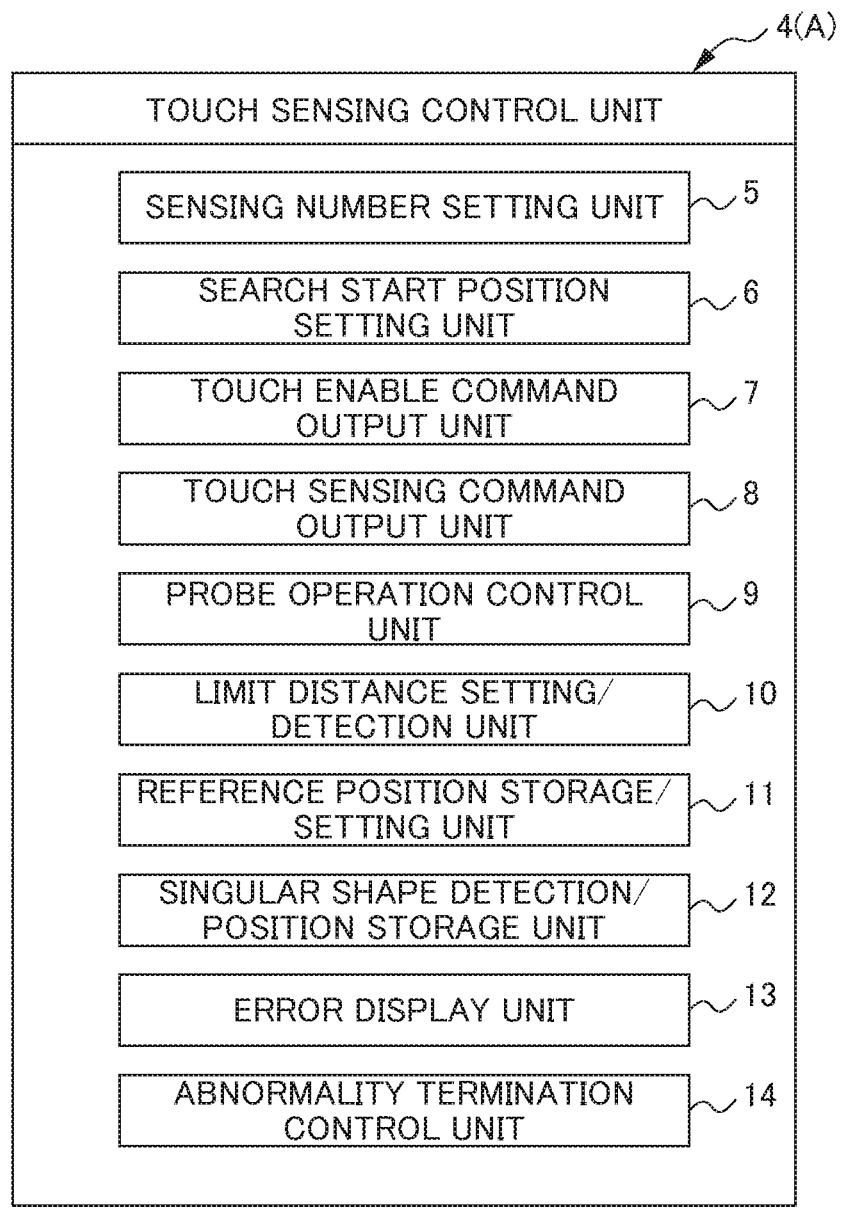
FIG. 3 is a diagram showing a touch sensing control unit of a touch sensing system of an embodiment.

Furthermore, as shown in FIG. 3, the touch sensing system A of the present embodiment includes a touch sensing control unit 4 for controlling the touch sensing system A.

The touch sensing control unit. 4 includes: a sensing number setting unit 5, a search start position setting unit 6, a touch enable command output unit 7, a touch sensing command output unit 8, a probe operation control unit 9, a limit distance setting/detection unit 10, a reference position storage/setting unit 11, a singular shape detection/position storage unit 12, an error display unit 13, and an abnormality termination control unit 14.

Figure 4:
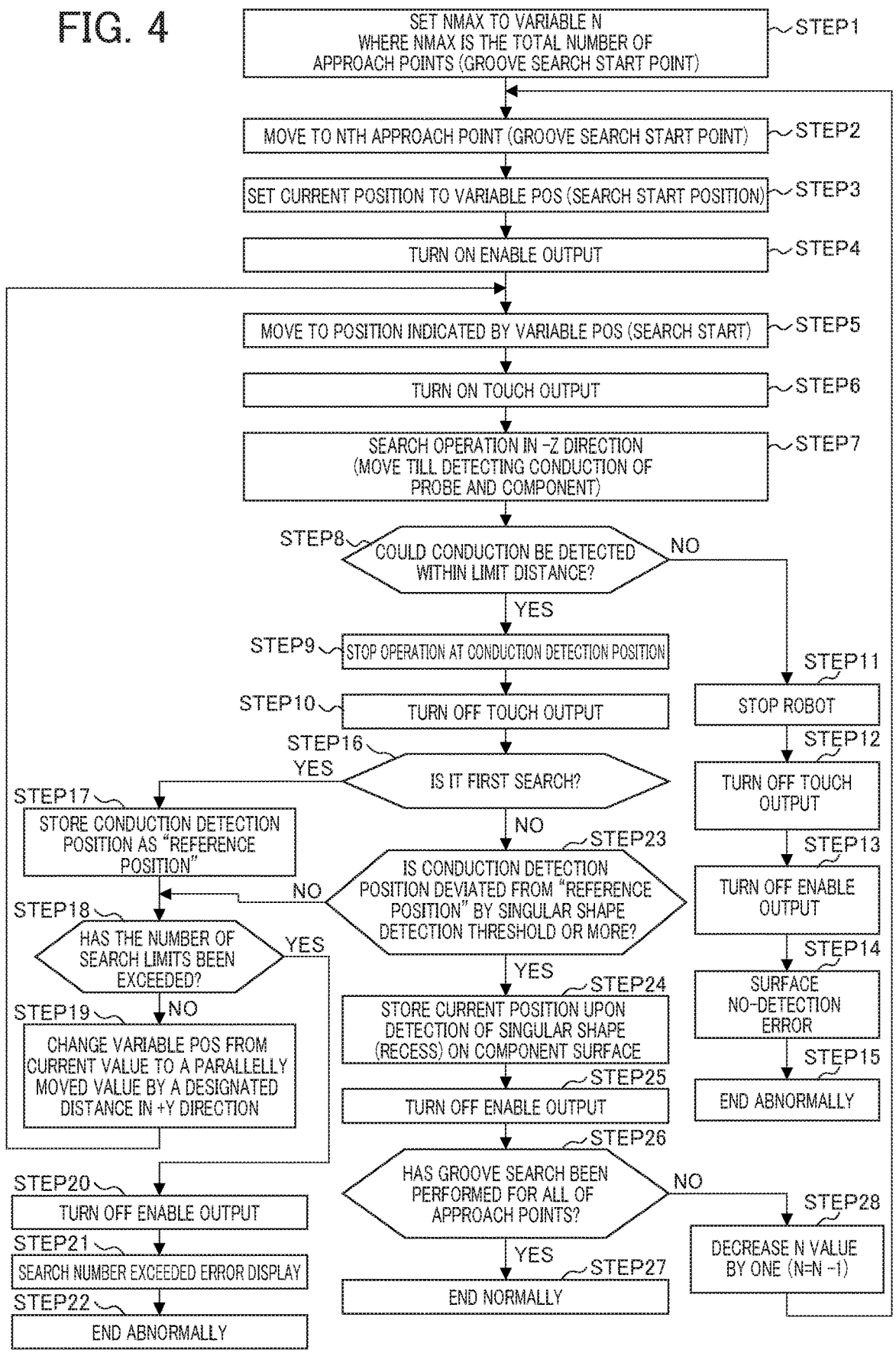
FIG. 4 is a diagram showing a flow of touch sensing using a touch sensing system of an embodiment.

In addition, in a case in which the touch sensing system A of the present embodiment is used to perform touch sensing on a groove or the like (such as a welding position), the total number Nmax of the Groove Search start points is set as the variable N by the sensing number setting unit 5 as shown in FIG. 4 (STEP 1).

Next, the probe operation control unit 9 moves the probe 101 (torch 101a and wire 101b) to the $N^{th}$ approach point (Groove Search start, point) (STEP 2), and the search start position setting unit sets the current position as a variable POS which is the search start position (STEP 3).

Next, the touch enable command output unit 7 issues a touch enable command to connect the touch sensing circuit 2 to the probe 101 by turning on the electromagnetic contactor 104 (STEP 4).

The probe operation control unit 9 moves the probe 101 to the position indicated by the variable POS on the basis of the present position set by the search start position setting unit 6 (STEP 5). In the first (N=1) touch sensing, the current position set by the search start position setting unit 6 is the position indicated by the variable POS, so that movement of the probe 101 is not required here.

In addition, the touch sensing command output unit 8 issues a touch sensing command, turns on the solid state relay switch 3, and enables touch sensing (STEP 6).

Next, the probe operation control unit 9 brings the probe 101 close to the base material T (object), and brings into contact with the surface T1 of the base material T (STEP 7). At this time, the movement amount of the probe 101 is detected by the limit distance setting/detection unit 10.

Herein, in the present embodiment, when the probe 101 contacts the surface T1 of the base material T, a voltage of 200 V or more from the touch sensing power supply 1 is applied to the base material T. For this reason, sparks will fall when the probe 101 contacts the surface T1 of the base material T, and thus, even if an oxide film is formed on the surface T1 of the base material T, the conduction can be achieved by penetrating the oxide film.

Next, the limit distance setting/detection unit 10 confirms whether the movement amount of the probe 101, i.e., the distance to the conduction of the probe 101, has been within the limit distance set in advance (STEP 8). In a case in which it is within the limit distance, the probe operation control unit 9 performs the stop control of the operation at the conduction detection position (STEP 9). At the same time, a command is issued from the touch sensing command output unit 8 to turn OFF the solid state relay switch 3 (STEP 10).

Herein, in a case in which the movement amount of the probe 101 exceeds the limit distance (STEP 8), i.e., in a case in which the probe 101 exceeds the limit distance but does not contact the T1 of the base material T, the operation of the robot is stopped (STEP 11), and a command is issued from the touch sensing command output unit 8 to turn OFF the solid state relay switch 3 (STEP 12). At the same time, a touch enable command is issued from the touch enable command output unit 7 to disconnect the touch sensing circuit 2 from the probe 101 by turning OFF the electromagnetic contactor 104 (STEP 13).

Furthermore, the error display unit 13 performs display of surface no-detection error (STEP 14), and the abnormality termination control unit 14 forcibly performs control of the abnormality end (STEP 15).

On the other hand, in a case in which the movement amount of the probe 101 is within the limit distance, the stop control of the operation at the conduction detection position is performed (STEP 9), and in a case in which the off control of the solid state relay switch 3 is performed (STEP 10), it is next confirmed whether it is the first (N=Nmax) search (STEP 16).

In a case in which it is the first search (N=Nmax), the reference position storage/setting unit 11 sets/stores the conduction detection position as the reference position (STEP 17). Furthermore, whether or not the number of search limits set in the sensing number setting unit 5 has been exceeded is confirmed (STEP 18). In a case in which the number of search limits has not been exceeded, the search start position setting unit 6 changes the variable POS from the current value to a value moved by a designated distance (STEP 19), and the probe operation control unit 9 moves the probe 101 to the position indicated by the variable POS (STEP 5), and the same operation as described above is performed.

In a case in which the number of search limits has been exceeded, a touch enable command is issued from the touch enable command output unit 7, and the touch sensing circuit 2 is disconnected from the probe 101 by turning OFF the electromagnetic contactor 104 (STEP 20). Furthermore, the error display unit 13 performs display of a search number exceeded error (STEP 21), and the abnormality termination control unit 14 forcibly performs control of the abnormality termination (STEP 22).

In a case in which, as a result of confirming whether it is the first time (N=Nmax) search (STEP 16), it is not the first time (N=Nmax) search, the singular shape detection/position storage unit 12 confirms whether the conduction detection position has been shifted by a singular shape detection threshold or more from the reference position (STEP 23). In a case in which the conduction detection position has been shifted by the singular shape detection threshold or more, the singular shape detection/position storage unit 12 determines that a singular shape such as a recess on the surface T1 of the base material T has been detected, and stores the present position (STEP 24).

In a case in which it is confirmed that the conduction detection position has not been shifted by the singular shape detection threshold or more, whether the number of search limits has been exceeded is confirmed (STEP 18), and the same operations as described above are performed.

Next, in a case in which it is confirmed that the conduction detection position has been shifted by the singular shape detection threshold or more, it is determined that the singular shape such as a recess on the surface T1 of the base material T has been detected, the touch enable command is issued from the touch enable command output unit 7 after storing the present position (STEP 24), and the touch sensing circuit 2 is disconnected from the probe 101 by turning off the electromagnetic contactor 104 (STEP 25).

In addition, it is confirmed whether or not Groove Search has been performed for all of the approach points (STEP 26), and in a case in which it is confirmed that Groove Search has been performed for all of the approach points, the processing ends normally (STEP 27).

In a case in which it is confirmed that the Groove Search has not been completed for all of the approach points (STEP 26), with N=N−1, the probe is moved to the N−1$^{th}$ approach point (STEP 2) and the same operations as described above are performed until the N=1 point (the final point).

Therefore, in the touch sensing system A of the present embodiment, the touch enable output of the electromagnetic contactor 104 is kept ON until the Groove Search operation is completed, and the touch sensing output of the solid state relay switch 3 is repetitively switched between ON/OFF during the Groove Search operation.

Thus, by configuring to switch ON/OFF the solid state relay switch 3 without contacts and avoid the switching of the electromagnetic contactor 104 during the Groove Search operation, it is unnecessary to perform the conventional alternating switching operation between the touch sensing circuit 2 and the welding circuit 103 (the repetition of ON/OFF of the touch sensing output of 200 V), and thus, it is possible to eliminate the problem of the touch sensing (Groove Search operation) affecting the life of the contact of the electromagnetic contactor 104.

Although an embodiment of a touch sensing system has been described above, the present invention is not limited to the one embodiment described above, and can be appropriately modified to an extent that does not deviate from the spirit of the present invention.

Figure 5:
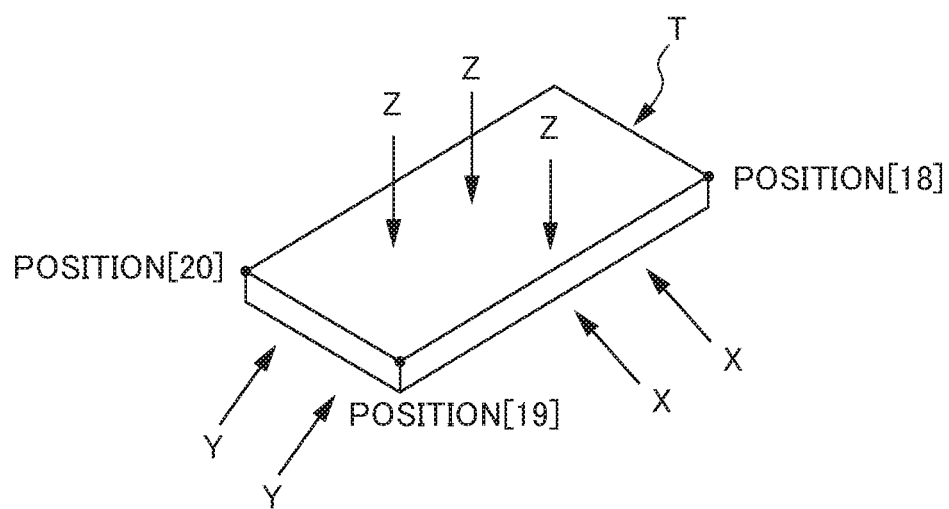
FIG. 5 is a diagram showing another application example of a touch sensing system of an embodiment.
Figure 6:
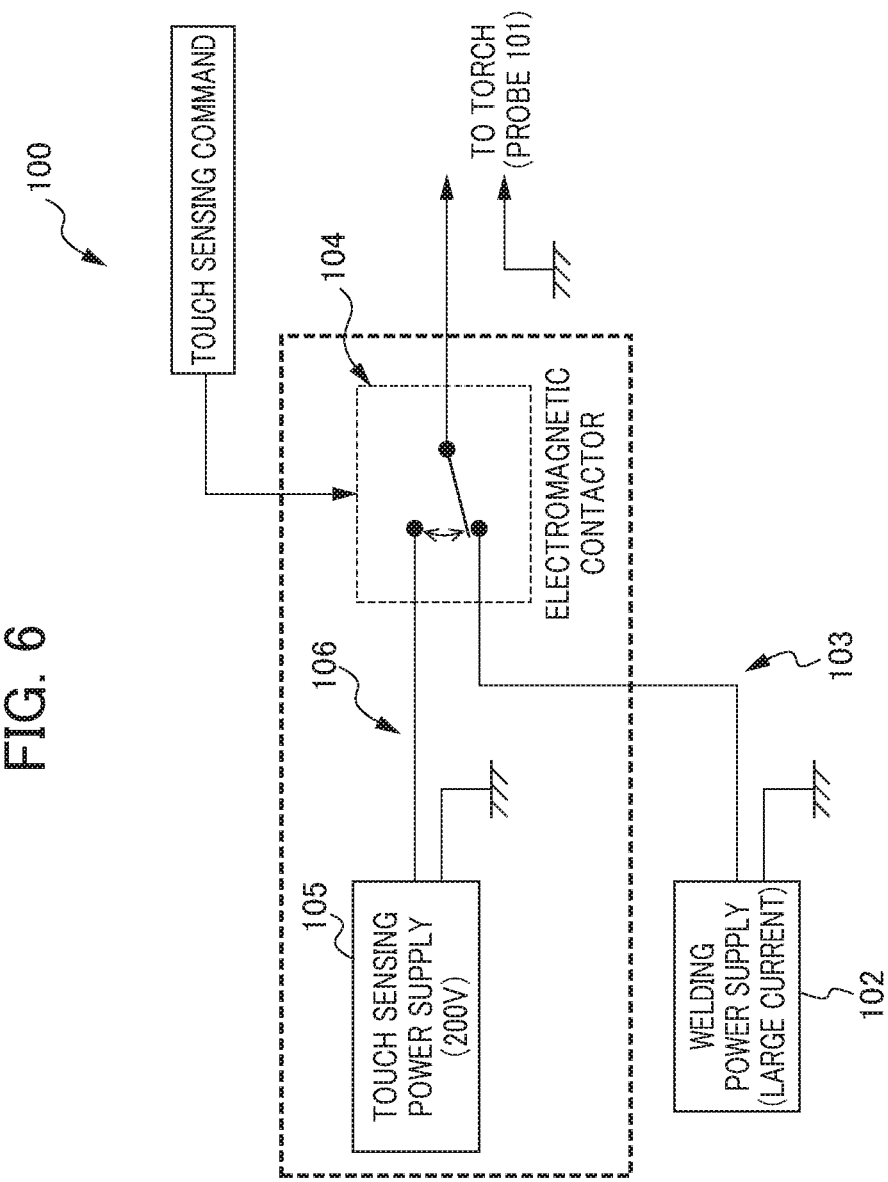
FIG. 6 is a diagram illustrating a conventional touch sensing system.

Although an example of application to the touch sensing by Groove Search has been described in the present embodiment, it is also applicable to another method other than the Groove Search. In a case of performing touch sensing in normal arc welding, many times of touch sensing may be required. For example, as shown in FIG. 5, in a case of performing a three-dimensional search, touch sensing is performed a number of times (in FIG. 5, a total of seven times indicated by X, Y, and Z). Therefore, by applying to such a case, as in the present embodiment, it is possible to make the life of the contacts of the electromagnetic contactor 104 longer.

Furthermore, it is not necessary to limit the application to arc welding. For example, one example in which large current flows and touch sensing is required is radiation coating by plasma.

EXPLANATION OF REFERENCE NUMERALS 1 touch sensing power supply
2 touch sensing circuit
3 solid state relay switch (non-contact relay switch: SSR)
4 touch sensing control unit
5 sensing number setting unit
6 search start position setting unit
7 touch enable command output unit
8 touch sensing command output unit
9 probe operation control unit
10 limit distance setting/detection unit
11 reference position storage/setting unit
12 singular shape detection/position storage unit
13 error display unit
14 abnormality termination control unit
101 probe
101*a* torch
101*b* wire
102 welding power supply (main operation power supply)
103 welding circuit (main operation circuit)
104 electromagnetic contactor
A touch sensing system
T base metal (object)

What is claimed is:

1. A touch sensing system comprising:
   a main operation circuit that connects a probe and a main operation power supply, and in which an electromagnetic contactor is provided; and
   a touch sensing circuit that is connected to the main operation circuit through the electromagnetic contactor in a branched manner, and connects the probe and a touch sensing power supply,
   wherein a solid state relay switch is provided in the touch sensing circuit.

2. The touch sensing system according to claim 1, wherein a main operation is arc welding.

3. The touch sensing system according to claim 2, wherein the touch sensing power supply is a power supply of 200 V or more.

4. The touch sensing system according to claim 3, further comprising a touch sensing control unit,
   wherein the touch sensing control unit includes:
   a sensing number setting unit that sets a total number of search start points;
   a probe operation control unit that controls an operation of the probe;
   a search start position setting unit that sets a search start position;
   a touch enable command output unit that controls the electromagnetic contactor;
   a touch sensing command output unit that controls the solid state relay switch; and
   a limit distance setting/detection unit that sets a limit distance between the probe and an object for touch sensing, and detects a distance between the probe and the object upon movement of the probe according to the probe operation control unit.

5. The touch sensing system according to claim 2, further comprising a touch sensing control unit,
   wherein the touch sensing control unit includes:
   a sensing number setting unit that sets a total number of search start points;
   a probe operation control unit that controls an operation of the probe;
   a search start position setting unit that sets a search start position;

a touch enable command output unit that controls the electromagnetic contactor;

a touch sensing command output unit that controls the solid state relay switch; and a limit distance setting/detection unit that sets a limit distance between the probe and an object for touch sensing, and detects a distance between the probe and the object upon movement of the probe according to the probe operation control unit.

6. The touch sensing system according to claim 1, wherein the touch sensing power supply is a power supply of 200 V or more.

7. The touch sensing system according to claim 6, further comprising a touch sensing control unit, wherein the touch sensing control unit includes:

a sensing number setting unit that sets a total number of search start points;

a probe operation control unit that controls an operation of the probe;

a search start position setting unit that sets a search start position;

a touch enable command output unit that controls the electromagnetic contactor;

a touch sensing command output unit that controls the solid state relay switch; and a limit distance setting/detection unit that sets a limit distance between the probe and an object for touch sensing, and detects a distance between the probe and the object upon movement of the probe according to the probe operation control unit.

8. The touch sensing system according to claim 1, further comprising a touch sensing control unit, wherein the touch sensing control unit includes:

a sensing number setting unit that sets a total number of search start points;

a probe operation control unit that controls an operation of the probe;

a search start position setting unit that sets a search start position;

a touch enable command output unit that controls the electromagnetic contactor;

a touch sensing command output unit that controls the solid state relay switch; and a limit distance setting/detection unit that sets a limit distance between the probe and an object for touch sensing, and detects a distance between the probe and the object upon movement of the probe according to the probe operation control unit.

9. The touch sensing system according to claim 1, the solid state relay switch being separate from the electromagnetic contactor.

10. The touch sensing system according to claim 1, the touch sensing circuit connecting the probe and the touch sensing power supply to detect contact between the probe and a workpiece.

* * * * *